United States Patent Office 2,988,563
Patented June 13, 1961

2,988,563
ORGANO-COBALT COMPOUNDS AND METHOD FOR PRODUCTION THEREOF
John C. Brantley, Snyder, N.Y., assignor to Union Carbide Corporation, a corporation of New York
No Drawing. Filed June 22, 1953, Ser. No. 363,402
25 Claims. (Cl. 260—439)

The invention relates to organo-metallic compounds and containing cobalt as the metal component and includes correlated improvements and discoveries whereby such cobalt compounds are obtained.

An object of the invention is the provision of organo-cobalt compounds in which the organic component includes a cyclopentadienyl carbon ring:

A further object of the invention is the provision of a process whereby a Grignard reagent, having as its organic component an organic residue containing a cyclopentadienyl ring structure (hereinafter designated a cyclopentadienyl ring Grignard reagent), may be reacted with a cobalt halide to provide compounds of this invention.

Other objects of the invention will in part be obvious and will in part appear hereinafter.

In the practice of the invention an alkyl Grignard reagent, as for example ethyl magnesium bromide, is reacted with an organic compound containing a cyclopentadienyl carbon ring and having a replaceable hydrogen on the methylene carbon of that ring to form a cyclopentadienyl ring Grignard reagent which has the general formula $$R \cdot Mg \cdot X$$

wherein R is an organic residue containing a cyclopentadienyl carbon ring as described above and X is halogen. The cyclopentadienyl ring Grignard reagent is then reacted with a cobalt halide, for example cobaltous bromide, in a suitable liquid medium.

While the organic compound containing the cyclopentadienyl ring should, prior to reaction with an alkyl Grignard reagent, contain a replaceable hydrogen on the methylene carbon of the cyclopentadienyl carbon ring, since introduction of MgX is to be effected on the methylene carbon atom of the ring, the number and character of substituents on the cyclopentadienyl carbon ring may otherwise be varied as desired. Cyclopentadiene, indene and their aliphatic and aromatic derivatives are examples of suitable organic compounds containing the cyclopentadienyl carbon ring. It is preferred that the organic compound containing the cyclopentadienyl carbon ring be selected from those compounds in which the cyclopentadienyl ring is distinctly alicyclic. For example, cyclopentadiene and indene are distinctly alicyclic for in the former no double bond is coordinately shared with an aromatic ring and in indene only one double bond is so shared. By contrast in fluorene each of the double bonds is coordinately shared with an aromatic ring and the alicyclic character of the cyclopentadienyl carbon ring is thus not substantially apparent. Those compounds which contain alicyclic cyclopentadienyl carbon rings include cyclopentadiene, its aliphatic derivatives as for example methyl, ethyl, allyl and vinyl cyclopentadiene, aromatic derivatives as for example phenyl cyclopentadiene, and indene and its comparable derivatives.

The primary product of reaction between the cyclopentadienyl ring Grignard reagent and a cobalt halide after hydrolysis is a compound containing the $R_2Co^+$ ion, due to the relatively greater stability under oxidizing conditions of this ion, as compared with the non-ionized form, $R_2Co$. The compounds of this invention include, in addition to the cationic and non-ionized and non-halogenated forms specified above, the tetrahalocobaltates of the cation:

$$(R_2Co)_2CoX_4$$

wherein X may be a single species of halogen or a mixture of halogens having the average general empirical formula $(R_2Co)_2CoX_yX'_z$ where X and X' are different halogens and y and z are any numbers totalling four. Also included are complex halides having the general formula $R_2CoX_3$ which may also be written $R_2CoX \cdot X_2$. The $R_2Co^+$ cation functions chemically as a large unipositive cation. It forms water-soluble halides and hydroxides, the latter being strong bases. It reacts with solutions of complex anions such as phosphotungstate or phosphomolybdate groups to form complexes.

As illustrative, when cyclopentadienyl magnesium bromide is reacted with cobaltous bromide and the reaction mixture hydrolyzed with dilute HBr a green crystalline product may be recovered which is:

$$[(C_5H_5)_2Co]_2CoBr_4$$

and may be termed bis[bis cyclopentadienyl-cobalt(III)] tetrabromocobaltate(II). When acidic aqueous solutions of this compound are reacted with hydrogen peroxide, an orange solid precipitates which has been found to be $(C_5H_5)_2CoBr_3$, a complex bromide which may be written $(C_5H_5)_2CoBr \cdot Br_2$. When the reaction mixture resulting from reaction of cyclopentadienyl magnesium bromide and cobaltous bromide is hydrolyzed with dilute HCl a mixed tetrahalide results which has the average empirical formula:

$$[(C_5H_5)_2Co]_2CoBr_yCl_z$$

where y and z are any numbers which total four. A similar mixed halide may be obtained by reacting cyclopentadienyl magnesium bromide with cobaltous chloride. It is not known whether the reaction product contains a true mixed halide compound or is merely a mixture of halides. Dilute acid solutions of the $R_2Co^+$ cation may be reduced in a Jones reductor (Zn—HCl) to give $R_2Co$. These compounds are oxidized to the cation on standing in air.

The compounds of this invention have the general empirical formula:

$$(R_2Co)_mCo_wX_n \cdot X_p$$

where R is as defined above and X is halogen (e.g. chlorine, bromine, iodine or fluorine or a mixture of two or more of these) and where m is 1 or 2; w is 0 when m is 1 and 1 when m is 2; n is 0 or 1 when w is 0, and 4 when w is 1; and p is 0 or 2 when n is 1, and 0 when n is 4 or 0.

The $R_2Co^+$ cation in its function as a large unipositive cation forms various compounds with numerous anions. Typical of these compounds are nitrates, iodates, phosphomolybdates, silicotungstates, and acetates.

Reaction between the cyclopentadienyl ring Grignard reagent and the cobalt halide may be carried out at temperatures from about −70° C. to about 100° C. but temperatures between about 15° C. and 30° C. are preferred. However, in the later phases of the reaction the temperature may be elevated above 100° C. The molecular ratio between the cyclopentadienyl Grignard reagent and the halide may vary. For example, ratios of 3:1, 2:1, 1:1 and 1:2 are suitable. It appears that the compound $R_2Co$ is first formed in the reaction but that hydrolysis of the reaction mass, which is preferred because it facilitates recovery of product, allows oxidation to the cationic form, $R_2Co^+$, which may be recovered in any of its numerous compounds.

The reactions in the formation of the cyclopentadienyl ring Grignard reagent and the reaction of those compounds with cobalt halide are conducted in liquid media. Ethyl ether, benzene or toluene are suitable liquid media for these reactions. Higher boiling liquids such as benzene and toluene are, of course, preferred where elevated reflux temperatures are desired to be attained.

The compounds of this invention may be recovered and purified by crystallization and recrystallization, by sublimation at reduced temperatures or by other methods. During the reactions, including the preparation of the cyclopentadienyl ring Grignard reagent as well as during recovery procedures, it is preferred that oxygen be excluded insofar as is practically possible. Therefore it is preferred that the reactions and recovery procedures be conducted in an inert atmosphere such as is obtained by provision of a nitrogen or argon atmosphere. Employment of such an inert atmosphere increases the yield and tends to minimize the occurrence of objectionable side reactions.

The compounds of this invention are in general colored compounds. They vary in color from green through red to brown and yellow depending upon the constituents and also concentrations when in solution. For example $(C_5H_5)_2Co$ is a red material in crystalline form and dissolves in organic solvents to give a red solution. $[(C_5H_5)_2Co]_2CoBr_4$ is a green crystalline solid soluble in water, acids, ethanol and acetone but insoluble to slightly soluble in other organic solvents and forms water solutions of various colors at different concentrations. A dilute aqueous solution is yellow, going to orange for more concentrated solutions, and finally turning green at higher concentrations. The green color may also be obtained in dilute aqueous solution by acidifying with a halogen acid, as for example HCl or HBr.

As illustrative embodiments of manners in which the invention may be practiced, the following examples are presented in which inert atmospheres were maintained during all stages of the procedure except where otherwise specifically noted.

Example I

An alkyl Grignard reagent was prepared by reacting 1.0 mole of magnesium with 1.05 moles of ethyl bromide in 400 ml. of ethyl ether. When the reaction was complete, 340 ml. of benzene were added and then 1.0 mole of cyclopentadiene was added. The reaction mass was permitted to stand overnight and was then refluxed for about 3 hours to complete formation of the cyclopentadienyl Grignard reagent. 0.125 mole of anhydrous cobaltous bromide was suspended in 300 ml. of ethyl ether and a portion of the cyclopentadienyl Grignard reagent solution containing 0.25 mole of $C_5H_5MgBr$ was added thereto, with stirring, at about 20° C. The reaction mixture was stirred for about 1¼ hours, and then one-half of the ether was removed by distillation followed by the addition of 150 ml. of benzene. Reflux was continued for about 1½ hours. The cooled reaction mass was then hydrolyzed with ice-cold dilute hydrochloric acid prepared by the addition of 25 ml. of concentrated HCl to 400 ml. of ice water. Hydrolysis and succeeding steps were carried out without an inert atmosphere. A layering of the reaction mass ensued, both the organic and aqueous acid layers being red in color. Extraction of aqueous layer with chloroform removed all of the organic solvent-soluble material and the extract contained no cobalt. The extracted aqueous layer was then filtered and the filtrate evaporated on a water bath to about 100 ml. A green solution resulted from which, upon cooling, green crystals separated. The crystals were removed by filtration, air dried and recrystallized from absolute ethanol.

Analysis of the recrystallized material showed it to have the average empirical formula:

$[(C_5H_5)_2Co]_2CoCl_{1.4}Br_{2.6}$

This compound is soluble in water, mineral acids, ethanol and acetone. It is insoluble in benzene and petroleum ether and only slightly soluble in chloroform.

Example II

The procedure set forth above in Example I was followed with the exception that cold dilute hydrobromic acid was used in the hydrolysis instead of hydrochloric acid. A simple bromide, instead of the mixed chloride-bromide of Example I, was obtained. The green crystalline solid obtained was recrystallized from ethanol, and analysis showed it to be:

$[(C_5H_5)_2Co]_2CoBr_4$

This green crystalline solid is soluble in water, mineral acids, ethanol and acetone but is insoluble or only slightly soluble in other organic solvents. It melts at 385° C. without decomposition in the absence of air and is stable under temperatures as high as 450° C. in vacuo. Addition of sodium hydroxide or sodium carbonate to a water solution of the compound precipitates a blue cobaltous hydroxide leaving $(C_5H_5)_2CoOH$ in solution.

Example III

A solution of $[(C_5H_5)_2Co]_2CoBr_4$ in dilute aqueous HBr was treated with hydrogen peroxide. An orange solid precipitated which was $(C_5H_5)_2CoBr_3$, and may be regarded as a complex bromide, $(C_5H_5)_2CoBr \cdot Br_2$. This compound is soluble in chloroform and ethanol but is not appreciably water-soluble. In this example an inert atmosphere was not used.

Example IV 0.5 mole of ethyl magnesium bromide was prepared by reacting 0.5 mole of magnesium with 0.56 mole of $C_2H_5Br$ in 400 ml. of ethyl ether, adding 400 ml. of toluene and removing the ether by distillation until the temperature reached about 100° C. Then 0.5 mole of indene was added to the ethyl magnesium bromide solution in toluene and the reaction mixture was heated to reflux for about 7 hours. The resulting reaction mass containing 0.5 mole of indenyl magnesium bromide in 400 ml. of toluene was cooled to about 20° C. and a slurry of 0.25 mole of cobaltous bromide in ethyl ether was added thereto with stirring, the temperature of the reaction mixture being maintained at 25° C. to 30° C. by means of an ice bath. After two hours the brown reaction mixture was hydrolyzed in air with ice-cold dilute hydrobromic acid containing 0.5 mole of hydrogen bromide. A red brown water layer resulted which was filtered in air and the filtrate evaporated under reduced pressure yielding a green solution containing $[(C_9H_7)_2Co]_2CoBr_4$ This solution was treated in air with hydrogen peroxide and the rust colored precipitate, $(C_9H_7)_2CoBr_3$, was recovered and dried.

Example V

One gram of the crystalline product produced according to Example II was dissolved in dilute aqueous HCl and passed through a Jones reductor column containing zinc. The effluent was discarded and the column was washed with $CHCl_3$ giving a red solution containing $(C_5H_5)_2Co$. This compound may be recovered from the solution and sublimed at about 1 mm. Hg pressure at 80° C. to give a sublimate of red crystals of $(C_5H_5)_2Co$. The compound is unstable in air, being easily oxidized to the more stable cationic form.

The compounds of this invention having characteristic colors, may be employed as coloring agents. Moreover, they provide water-soluble and organic-soluble organo-cobalt compounds which may be employed as fuel additives and the like. Compounds having the empirical formula $R_2Co$, by reason of their affinity for oxygen, may be employed as oxygen stripping agents and as paint driers.

Since certain changes in carrying out the above process and certain modifications in the composition which embody the invention may be made without departing from its scope, it is intended that all matter contained in the above description shall be interpreted as illustrative and not in a limiting sense.

Having described my invention, what I claim as new and desire to secure by Letters Patent is:

1. As a composition of matter, an organo-cobalt compound having the empirical formula:

$$(R_2Co)_m Co_w X_n \cdot X_p$$

in which R represents an organic residue selected from the group consisting of cyclopentadienyl, indenyl and lower alkyl-substituted derivatives thereof; X represents halogen; $m$ has one of the values 1 and 2; $w$ is 0 when $m$ is 1 and $w$ is 1 when $m$ is 2; $n$ has one of the values 0 and 1 when $w$ is 0, and $n$ is 4 when $w$ is 1; $p$ has one of the values 0 and 2 when $n$ is 1, $p$ is 0 when $n$ is 4 and $p$ is 0 when $n$ is 0.

2. As a composition of matter, an organo-cobalt compound selected from the group consisting of ionic compounds containing the unipositive organo-cobalt cation, $R_2Co^+$ and non-ionic compounds having the empirical formula $R_2Co$, where R represents an organic residue selected from the group consisting of cyclopentadienyl, indenyl and lower alkyl substituted derivatives thereof.

3. As a composition of matter, an organo-cobalt compound having an organo-cobalt cation containing cobalt and, as the organic component, organic residues selected from the group consisting of cyclopentadienyl, indenyl and lower alkyl substituted derivatives thereof, the organic residues and the atoms of cobalt in said cation being in the ratio of 2:1.

4. As a composition of matter, an organo-cobalt compound containing a unipositive organo-cobalt cation, said cation having the empirical formula $$R_2Co^+$$

where R represents an organic residue selected from the group consisting of cyclopentadienyl, indenyl and lower alkyl substituted derivatives thereof.

5. As a composition of matter, an organo-cobalt composition having the average formula:

$$(R_2Co)_2 CoX_y X'_z$$

in which R represents an organic residue selected from the group consisting of cyclopentadienyl, indenyl and lower alkyl substituted derivatives thereof, X and X′ represent different halogens and $y$ and $z$ are numbers totaling 4.

6. As a composition of matter, an organo-cobalt halide having the average formula:

$$[(C_5H_5)_2Co]_2 CoX_y X'_z$$

wherein X and X′ represent different halogens and $y$ and $z$ are numbers totalling 4.

7. As a composition of matter, an organo-cobalt halide having the formula:

$$(R_2Co)_2 CoX_4$$

wherein R represents an organic residue selected from the group consisting of cyclopentadienyl, indenyl and lower alkyl substituted derivatives thereof and X represents a halogen.

8. As a composition of matter, an organo-cobalt halide having the formula:

$$[(C_5H_5)_2Co]_2 CoBr_4$$

9. As a composition of matter, an organo-cobalt halide having the formula:

$$[(C_5H_5)_2Co]_2 CoCl_4$$

10. As a composition of matter, an organo-cobalt compound having the empirical formula:

$$R_2Co$$

wherein R represents an organic residue selected from the group consisting of cyclopentadienyl, indenyl and lower alkyl substituted derivatives thereof.

11. As a composition of matter, an organo-cobalt compound having the empirical formula:

$$(C_5H_5)_2Co$$

12. As a composition of matter, an organo-cobalt compound having the empirical formula:

$$(C_9H_7)_2Co$$

wherein $C_9H_7$ is indenyl.

13. As a composition of matter, an organo-cobalt halide having the empirical formula:

$$R_2CoX_3$$

wherein R represents an organic residue selected from the group consisting of cyclopentadienyl, indenyl and lower alkyl substituted derivatives thereof and X represents halogen.

14. As a composition of matter, an organo-cobalt halide having the empirical formula:

$$(C_5H_5)_2CoX_3$$

where X is halogen.

15. As a composition of matter, an organo-cobalt bromide having the empirical formula:

$$(C_5H_5)_2CoBr_3$$

16. As a composition of matter, an organo-cobalt halide having the empirical formula:

$$(C_9H_7)_2CoX_3$$

where $C_9H_7$ is indenyl and X is halogen.

17. As a composition of matter, an organo-cobalt bromide having the empirical formula:

$$(C_9H_7)_2CoBr_3$$

wherein $C_9H_7$ is indenyl.

18. A process for the preparation of organo-cobalt compounds which comprises reacting a cobalt halide with a reagent having the formula:

$$R \cdot Mg \cdot X$$

wherein R represents an organic residue selected from the group consisting of cyclopentadienyl, indenyl and lower alkyl substituted derivatives thereof and X represents a halogen, at a temperature between about −70° C. and 100° C., and recovering the organo-cobalt compound.

19. A process for the preparation of organo-cobalt compounds which comprises reacting a cobalt halide with a reagent having the formula:

$$R \cdot Mg \cdot X$$

wherein R represents an organic residue selected from the group consisting of cyclopentadienyl, indenyl and lower alkyl substituted derivatives thereof and X represents a halogen, at a temperature between about 15° C. and 30° C.

20. A process for the preparation of cyclopentadienyl-cobalt halides which comprises reacting cobaltous halide with a reagent having the formula:

$$C_5H_5 \cdot Mg \cdot X$$

wherein X represents a halogen and recovering the cyclopentadienyl-cobalt halide.

21. A process for the preparation of bis[bis cyclopentadienyl-cobalt(III)]tetrahalocobaltate(II) which comprises reacting cobaltous halide with a cyclopentadienyl magnesium halide and hydrolyzing said reaction mixture in cold dilute aqueous solution of a halogen acid.

22. A process for the preparation of bis[bis indenyl-cobalt(III)]tetrahalocobaltate(II) which comprises reacting a cobaltous halide with an indenyl magnesium halide and hydrolyzing said reaction mixture in cold dilute aqueous solution of a halogen acid.

23. A process for producing compounds having the empirical formula $R_2CoX_3$, in which R is an organic residue selected from the group consisting of cyclopentadienyl, indenyl and lower alkyl substituted derivatives thereof and X is halogen, which comprises forming a dilute aqueous solution containing halogen anion and the $R_2Co^+$ cation, wherein R is as defined above, and treating said solution with hydrogen peroxide.

24. A process for the preparation of bis cyclopentadienyl-cobalt trihalide which comprises forming a dilute aqueous acidic solution of bis[bis cyclopentadienyl-cobalt(III)]tetrahalocobaltate(II), treating said solution with hydrogen peroxide and recovering therefrom said bis cyclo-pentadienyl-cobalt trihalide.

25. A process for the preparation of $(C_5H_5)_2CoBr_3$ which comprises forming a solution of $$[(C_5H_5)_2Co]_2CoBr_4$$

in dilute aqueous hydrobromic acid and treating said solution with hydrogen peroxide.

References Cited in the file of this patent

The Van Nostrand Chemist's Dictionary (1953), D. Van Nostrand Co. Inc. N.Y. (Honig et al.).

Hackh's Chemical Dictionary, 3rd ed. Blakiston Co. (1944), Philadelphia.

Fischer et al.: Zeitschrift fur Naturforshung, vol. 7b, No. June 20, 1952.

Page et al.: J. Am. Chem. Soc., vol. 74, pages 6149–50, Dec. 5, 1952 (received June 12, 1952).

Wilkinson: J. Am. Chem. Soc., vol. 74, Dec. 5, 1952, pages 6148–49 (received June 12, 1952).

Fischer et al.: Zeitschrift fur Naturforschung, vol. 8b, No. 1, pages 1 and 2, January 1953.

Fischer: Angewandte Chemie, vol. 64, 22, November 7, 1952, pages 620–621.